Figure 3:
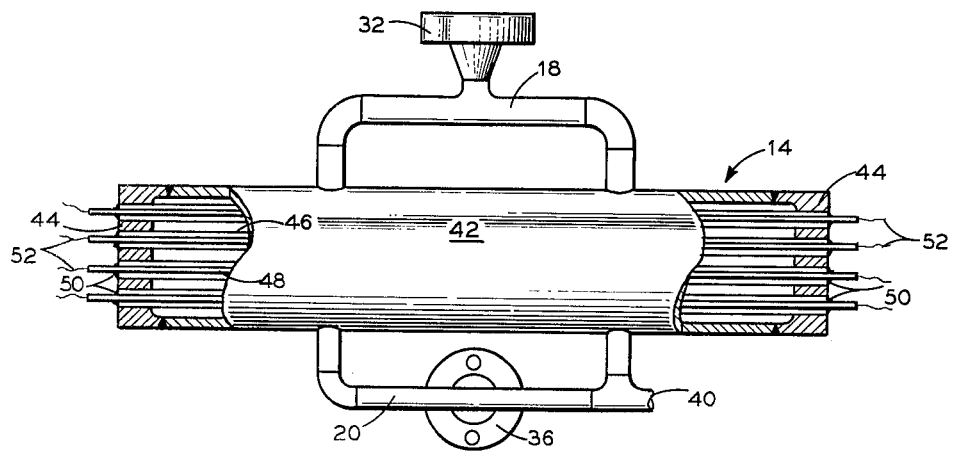

April 12, 1966 R. A. BENEDICT ET AL 3,245,463
FLUID PRESSURIZER
Filed Sept. 10, 1959 2 Sheets-Sheet 1
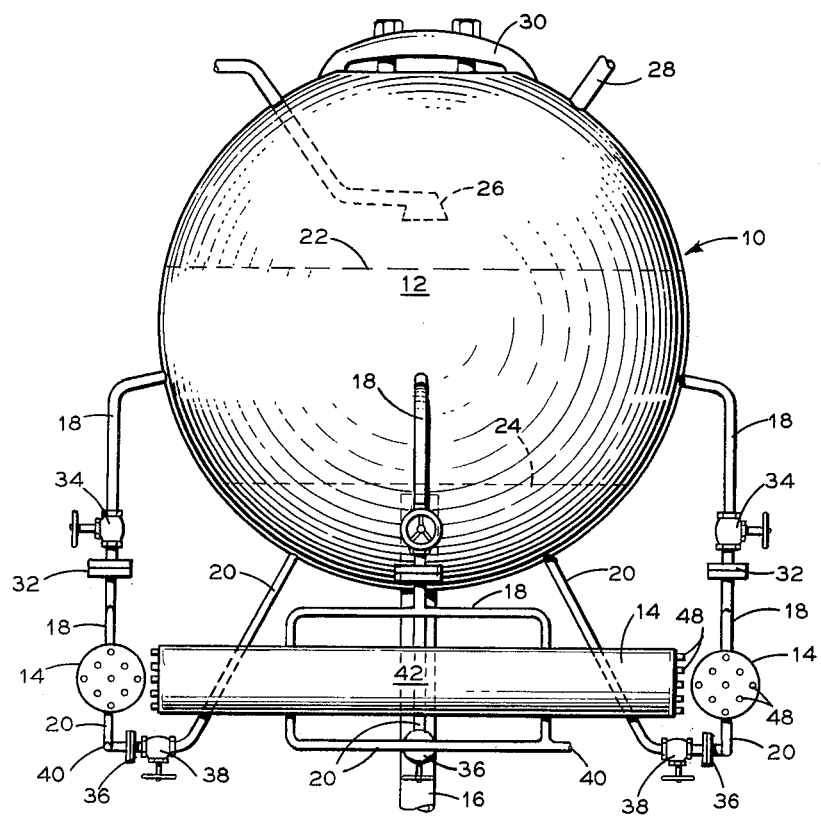
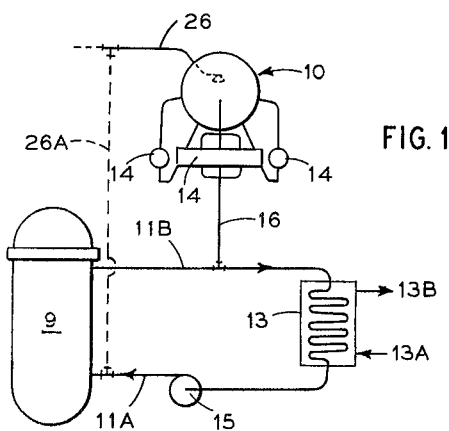
INVENTORS
Robert A. Benedict
Patrick E. Carroll
BY
ATTORNEY April 12, 1966 R. A. BENEDICT ET AL 3,245,463
FLUID PRESSURIZER
Filed Sept. 10, 1959 2 Sheets-Sheet 2

INVENTORS
Robert A. Benedict
Patrick E. Carroll
BY
ATTORNEY

United States Patent Office 3,245,463
Patented Apr. 12, 1966

3,245,463
FLUID PRESSURIZER
Robert A. Benedict and Patrick E. Carroll, Lynchburg, Va., assignors to The Babcock & Wilcox Company, New York, N.Y., a corporation of New Jersey
Filed Sept. 10, 1959, Ser. No. 839,252
6 Claims. (Cl. 165—105)

This invention relates in general to a fluid pressurizer and more particularly to a fluid pressurizer for use in a pressurized water type of nuclear steam generator; its function being to establish and maintain the nuclear generator's primary coolant system at a pressure whose saturation temperature is above the operating temperature of the reactor and thus prevent boiling in the core during warmup, steady state operation, load changes, and shutdown. The fluid pressurizer in accordance with this invention comprises essentially a pressurizer vessel, a heating source, surge line, and spray line.

In a pressurized water nuclear steam generator it is desirable to maintain the system pressure within specified limits. This is accomplished by the use of the pressurizer of the present invention which may be characterized as a steam boiler with zero steam output. The pressurizer is connected to the primary coolant system of the nuclear steam generator by a surge line which transmits pressure between the pressurizer and the primary coolant system. The surge line is of a size such that it will transmit pressure between the pressurizer and the primary coolant system and yet limit the interchange of fluid therebetween. In this way heat generated in the pressurizer is not lost by circulation of the pressurizer fluid into the primary coolant system. Should the pressure in the reactor primary coolant system drop below a desired minimum value, the heaters in the pressurizer generate steam to restore the system pressure to the desired normal value. Conversely should the system pressure rise above a maximum value, a spray line injects water into the steam space to cool the vapor in the pressurizer and thus reduce the system pressure to the normal value.

In prior art pressurizer arrangements the heaters are of a cartridge type which are inserted through the pressurizer vessel bottom or sides. The fact that the heaters are positioned within the vessel in the region where the water level is subjected to insurges and outsurges necessitates the use of a large size vessel to provide the requisite volume of water to prevent uncovering of the heaters during a water outsurge. This is necessary to prevent the burnout of the heaters, which would be possible should the water level ever fall below that required to keep the heaters submerged. This large volume of water requires, for a given heater capacity, a longer warmup time. Further, this arrangement necessitates a large number of penetrations into the vessel while at the same time it increases the possibility of weld failures at these penetration areas. Maintenance time is also increased due to the fact that, to repair or replace a heater, the entire reactor system must be shut down and the pressurizer vessel drained.

The present invention obviates these disadvantages by providing a pressurizer having a plurality of heat exchangers exterior to and located below the pressurizer vessel. These heat exchangers have a heating means such as a plurality of electric cartridge type heaters disposed therein to provide the steam generating means necessary to maintain the primary coolant system pressure at the desired level. Furthermore, the heat exchangers of the present invention may be removed a distance away from the pressurizer vessel so that optimum equipment arrangement may be realized.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of the invention.

Figure 4:
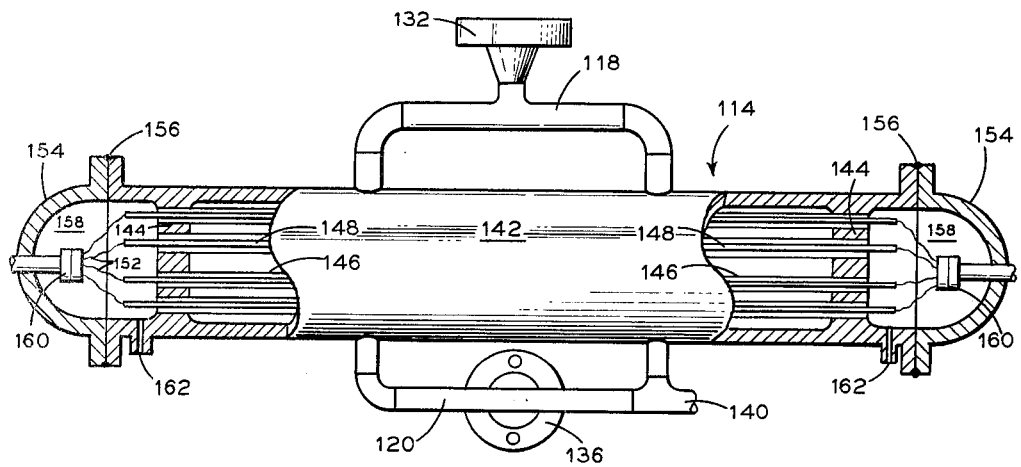

Of the drawings:
FIG. 1 is a schematic showing the pressurizer of the present invention in relation to the reactor primary coolant system;
FIG. 2 is an elevation view of the present invention;
FIG. 3 is an elevation view, partly in section, of the heat exchanger of the present invention; and
FIG. 4 is an elevation view, partly in section, of an alternate heat exchanger arrangement of the present invention.

Referring to FIG. 1, a primary coolant system of a pressurized water type nuclear steam generator is schematically illustrated to show the position of pressurizer 10, in relation to the remainder of the system. The primary coolant system includes a nuclear reactor 9 connected via an inlet line 11A and an outlet line 11B to a heat exchanger 13. Primary coolant fluid is heated in the reactor 9 by the nuclear fission occurring therein and passes to the heat exchanger 13 through line 11B. The heat contained in the primary coolant fluid is given via indirect heat transfer to a secondary coolant fluid flowing through the secondary side of the heat exchanger 13. This secondary fluid enters the heat exchanger through line 13A, is heated by the primary fluid, and leaves by line 13B to produce useful work, as in a steam turbine (not shown). After the primary coolant leaves the heat exchanger 13, it is circulated by a pump 15 through line 11A back to the reactor 9, completing the cycle. The pressurizer 10 is connected to the outlet line 11B of the primary coolant system via a surge line 16.

The pressurizer 10, to be described, is provided to establish and maintain the primary coolant system within predetermined pressure limits throughout the entire operating cycle, i.e. during (1) warm-up, (2) steady state operation, (3) changes in load, and (4) shutting down. The pressurizer also compensates for increases or decreases in the volume of the primary coolant as its density varies in accordance with changes in the average temperature of the primary coolant. This is accomplished by maintaining in the pressurizer a saturated water zone and a saturated steam zone, both at a temperature above the highest temperature reached in the primary coolant. Thus boiling is prevented in the primary coolant system and any changes in the density thereof are compensated by changes in the relative volumes occupied by the saturated steam and water fractions in the pressurizer.

In FIG. 2 there is shown the pressurizer, generally indicated by 10, of the present invention comprising a pressure vessel 12 and four external heat exchangers 14 arranged in a square pattern about the base of the pressure vessel. The pressure vessel 12 is illustrated as being spherical, but other forms may be used effectively. Penetrating the bottom of the vessel 12 is the surge line 16 which has one end communicating with the interior of the vessel and the opposite end in communication with the primary coolant system line 11B of the pressurized water nuclear steam generator, as shown in FIG. 1.

The heat exchangers 14 are positioned below the pressure vessel 12 and connected to and in communication therewith via risers 18 and downcomers 20. These heat exchangers are illustrated as being immediately subjacent the pressure vessel; however, they may be removed any suitable distance away therefrom and remain connected thereto by the risers and downcomers.

The pressure vessel 12 is adapted to contain a body of liquid having a liquid level which divides the vessel volume into a liquid portion and a vapor portion. The amount of liquid contained in the vessel at any particular time is a function of the temperature in the primary coolant system. In any case, the upper limit of the liquid level would be below the spray nozzle 26, and would generally approximate that level indicated by line 22. The lower limit of the liquid level would be determined by the elevation of the open ended surge line 16 in the vessel and would be approximately as shown by line 24.

A spray water line and nozzle 26, fed from the primary water make-up system (not shown), or the primary pump discharge line 11A via line 26A, opens into the upper (vapor) portion of the vessel 12, the operation of which will be further described below. A safety valve connection 28 and a manway closure 30 are shown in the upper portion of the vessel.

The risers 18 from the top of the heat exchanger shell 14 discharge into the pressure vessel 12 above the low liquid level, line 24. The downcomers 20 extend from the bottom of the heat exchanger shell 14 to the lower portion of the pressure vessel 12, entering the vessel below the lower limit of the liquid level 24 so that the downcomers will always be filled with liquid. With the riser and downcomer connections located thusly there is little or no possibility of reversing the flow of fluid through the heat exchangers. In this location, too, there would be no chance of the liquid being drawn out of the heat exchangers during an outsurge since the heat exchanger is below the open end of the surge line 16. The risers 18 are provided with a coupling 32 and a valve 34 located on the pressurizer vessel side of the riser line. The downcomer 20 also has a coupling 36 and valve 38 between the heat exchanger 14 and the pressurizer vessel 12. By closing the valves 34 and 38 and disconnecting the couplings 32 and 36 in the riser and downcomer lines, 18 and 20 respectively, the heat exchanger 14 thereattached may be isolated and removed from the pressurizer system. Further, the heat exchanger 14 is provided with a drain connection 40 at its lowest point that is valved and coupled (not shown) similar to the riser and downcomer lines so that, after isolation of the heat exchanger 14 from the pressurizer system, the heat exchanger may be drained of all fluid before removal from the system.

A detail of the heat exchanger 14 in FIG. 2 is shown removed from the pressurizer system in FIG. 3. The heat exchanger 14 comprises a shell 42 and integral tube sheets 44. A plurality of tubes 46, positioned within the shell 42, have their ends secured in the tube sheets 44. An electrical heater 48 is fixed in each tube 46 by a weld 50 at the outer face of the tube sheets 44. Suitable electric leads 52 extend to an external power source (not shown). By placing the heaters 48 within the tubes 46, and by making the welds 50, double protection against leakage at the heater connections is provided, since both the tube and the weld would have to be damaged before leakage would occur.

An alternate arrangement of the heat exchanger is shown in FIG. 4 with parts corresponding to previously described parts given the same numbers as before with a prefix of "1." This heat exchanger 114 consists of a shell 142, tube sheets 144, tubes 146, and heaters 148 as described above with the addition of heads 154 attached and seal-welded as at 156 to the shell 142. These heads form chambers 158 adjacent the tube sheets 144. The heaters 148 are positioned in but not attached to, the tubes 146. Thus, the heaters are free to expand independent of any restraint by the tubes. The heaters are connected by suitable electric leads 152 to quick-disconnect junctions 160 located in the chambers 158, one-half of each junction 160 being integrally attached to the electric leads 152 to the heaters and the other half integrally connected through the heads 154 to an external power (not shown). With this type of connection, maintenance of the heaters in the heat exchanger is simplified, requiring only the removal of the heads 154 from the heat exchanger, the disconnection of the junctions 160, and the removal of the heaters from the tubes.

Further, conduits 162 may be provided to the chambers 158 as part of a monitoring system (not shown) to provide a continuous check for any leakage through the tubes or tube sheets to the heaters. Should extra protection not be necessary for the heaters, the tubes could be eliminated and the heaters connected only to the heat exchanger shell or tube sheet in direct contact with the heated fluid. This alternate arrangement may be used where continuous monitoring against leakage is desired or where the differential thermal expansion between the heaters and the tubes is so great as to cause failure of the welds 50 in the first shown embodiment.

Alternately, a heat transfer fluid from an external heat source flowing in the tubes 146 of the heat exchanger might be used instead of electric heating elements to provide the energy for producing the steam in the pressurizer.

In operation the pressurizer is filled with water to a level somewhere between the water level lines 22 and 24 via the surge line 16 from the primary coolant system. The water also fills the heat exchangers 14, the downcomer lines 20, and at least a portion of the risers 18, readying the pressurizer for operation. To increase the pressure in the pressurizer, and thereby the pressure of the primary coolant system which is connected to the pressurizer by the surge line 16, the heaters 48 in the tubes 46 of the heat exchanger 14 are energized. This heats the water in the heat exchanger by indirect heat transfer through the tubes 46. As the water in the heat exchanger is heated, steam is formed and a steam-water mixture carried to the upper portion of the pressurizer vessel by the riser tubes 18. As the steam and water portions contained in the pressurizer reach an equilibrium temperature an operating pressure is established, which is then imparted to the primary coolant system through the surge line 16.

Normally, a liquid level control system, of a type well known in the art, maintains the water level in the pressurizer between the operating limits indicated by lines 22 and 24 and would protect the heaters against burning out by cutting off the power thereto if the water were to fall below the low level limit necessary to keep the heaters covered. One instance that might require this protection would result from a contraction in the primary water volume due to a lower average temperature of the primary coolant system. In previous pressurizer designs the possibility that the water level might be lowered too fast through the surge line to the primary system has caused serious concern as to the ability of the control system to protect the heaters against burning out. In the present invention this possibility is eliminated by placing the heaters below the open ended surge line in the pressurizer vessel. Thus, should the surge line drain water from the pressurizer vessel, the lower limit of the water would be the level of the surge line open end, well above the heaters located exterior of and below the vessel and only connected thereto by the riser and downcomer lines.

In normal operation, the pressurizer would contain water in the lower portion and steam in the upper portion. Should the volume of liquid in the primary coolant system increase as a result of a higher average temperature therein, increasing the pressure in both the primary coolant system and the pressurizer, the spray line and nozzle 26 would open spraying relatively cold water into the steam space. In this way a portion of the steam would be condensed, reducing the pressure therein to the control value.

The present invention permits the use of fewer, longer, and higher capacity heaters than would be possible if the heaters were located within the pressurizer vessel proper. Due to the fact that they are located exteriorly of the vessel and below the surge line opening within the vessel, there is no danger of the heaters becoming uncovered and burning out during an outsurge of water.

Also, the present invention provides risers and downcomers interconnecting the heat exchanger and the pressurizer vessel which have means to isolate each heat exchanger from the pressurizer vessel. This permits removal of a complete heat exchanger and its associated heaters from the pressurizer for maintenance or replacement without taking the pressurizer out of operation.

Placing the heaters in heat exchangers outside of the pressurizer permits the use of a smaller pressurizer vessel and a reduction in the number of penetrations through the vessel wall. Thus thinner walled vessels may be used, with the optimal wall thickness attained when using a spherical vessel. This reduced vessel thickness also reduces the required heater capacity since there is less metal mass to absorb heat.

Additional advantages inherent in the present invention include the reduction of maintenance costs arising from the ease of cleaning the interior of the pressurizer vessel since it contains a reduced number of internal parts. Also, less space is required by this pressurizer design due to the heater arrangement. In previous designs much more space was necessary adjacent the pressurizer to permit the removal of the heaters therefrom than is necessary with the present invention.

While the present invention has been described in relation to, and as associated with a nuclear reactor, it may be utilized in any system requiring pressurization or the net generation of steam.

While in accordance with the provisions of the statutes we have illustrated and described herein the best forms and modes of operation of the invention now known to us, those skilled in the art will understand that changes may be made in the forms of the apparatus disclosed without departing from the spirit of the invention covered by our claims, and that certain features of our invention may sometimes be used to advantage without a corresponding use of other features.

We claim:

1. In combination with a pressurized closed liquid system, a pressurizer comprising a vessel containing a body of vaporizable liquid having a liquid level separating a lower liquid space from an upper vapor space, a combined surge inlet and outlet line terminating in the lower liquid space of said vessel and communicating with said pressurized liquid system, a heat exchanger exterior of said vessel and below said liquid level, an inlet conduit to said heat exchanger from the liquid space of said vessel below the end of said surge line, an outlet conduit from said heat exchanger to said vessel at a location above the end of said surge line, and a heating means located within said heat exchanger arranged to vaporize liquid therein and discharge the vapor generated through said outlet conduit to said vessel.

2. In combination with a pressurized closed liquid system, a pressurizer comprising a vessel containing a body of vaporizable liquid having a liquid level separating a lower liquid space from an upper vapor space, a combined surge inlet and outlet line terminating in the lower liquid space of said vessel and communicating with said pressurized liquid system, a spray nozzle in the upper vapor space of said vessel, means to variably supply said nozzle with cooling liquid to condense the vapor in said vapor space of said vessel, a heat exchanger exterior of said vessel and below said liquid level, an inlet conduit to said heat exchanger from the liquid space of said vessel below the end of said surge line, an outlet conduit from said heat exchanger to said vessel at a location above the end of said surge line, and a heating means located within said heat exchanger arranged to vaporize liquid therein and discharge the vapor generated through said outlet conduit to said vessel.

3. In combination with a pressurized closed liquid system, a pressurizer comprising a vessel containing a body of vaporizable liquid having a liquid level separating a lower liquid space from an upper vapor space, a combined surge inlet and outlet line terminating in the lower liquid space of said vessel and communicating with said pressurized liquid system, a spray nozzle in the upper vapor space of said vessel, means to variably supply said nozzle with cooling liquid to condense the vapor in said vapor space of said vessel, a plurality of heat exchangers exterior of said vessel and below said liquid level, an inlet conduit to each of said heat exchangers from the liquid space of said vessel below the end of said surge line, an outlet conduit from each of said heat exchangers to said vessel at a location above the end of said surge line, and heating means located within said heat exchangers arranged to vaporize liquid therein and discharge the vapor generated through said outlet conduit to said vessel.

4. In combination with a pressurized closed liquid system, a pressurizer comprising a spherical vessel containing a body of vaporizable liquid having a liquid level separating a lower liquid space from an upper vapor space, a combined surge inlet and outlet line terminating in the lower liquid space of said vessel and communicating with said pressurized liquid system, a plurality of shell and tube type heat exchangers exterior of said vessel and below said liquid level, an inlet conduit to the shell side of each of said heat exchangers from the liquid space of said vessel below the end of said surge line, an outlet conduit from the shell side of each of said heat exchangers to said vessel at a location above the end of said surge line, and heating means located within said tubes of said heat exchangers in indirect heat transfer relationship with said shell side and arranged to vaporize liquid therein and discharge the vapor generated through said outlet conduit to said vessel.

5. In combination with a pressurized closed liquid system, a pressurizer comprising a spherical vessel containing a body of vaporizable liquid having a liquid level separating a lower liquid space from an upper vapor space, a combined surge inlet and outlet line terminating in the lower liquid space of said vessel and communicating with said pressurized liquid system, a spray nozzle in the upper vapor space of said vessel, means to variably supply said nozzle with cooling liquid to condense the vapor in said vapor space of said vessel, a plurality of heat exchangers exterior of said vessel and below said liquid level, an inlet conduit to each of said heat exchangers from the liquid space of said vessel below the end of said surge line, an outlet conduit from each of said heat exchangers to said vessel at a location above the end of said surge line, means cooperating with said conduits to individually isolate and remove said heat exchangers from said vessel, heating means located within said heat exchangers arranged to vaporize liquid therein and discharge the vapor generated through said outlet conduits to said vessel, and means responsive to the pressure of said pressurized liquid system to variably energize said heating means and said nozzle to maintain the pressure therein within predetermined limits.

6. In combination with a pressurized closed liquid system, a pressurizer comprising a spherical vessel containing a body of vaporizable liquid having a liquid level separating a lower liquid space from an upper vapor space, a combined surge inlet and outlet line terminating in the lower liquid space of said vessel and communicating with said pressurized liquid system, a spray nozzle in the upper vapor space of said vessel, means to variably supply said nozzle with cooling liquid to condense the vapor in said vapor space of said vessel, a plurality of shell and tube type heat exchangers exterior of said vessel and below said liquid level, an inlet conduit to the shell side of each of said heat exchangers from the liquid space of said vessel below the end of said surge line, an outlet conduit from the shell side of each of said heat exchangers to said vessel at a location above the end of said surge line, means cooperating with said conduits to individually isolate and remove said heat exchangers from said vessel, electric heating means located within said tubes of said heat exchangers in indirect heat transfer relationship with said shell side and arranged to vaporize liquid therein and discharge the vapor generated through said outlet conduit to said vessel, and means responsive to the pressure of said pressurized liquid system to variably energize said heating means and said nozzle to maintain the pressure therein within predetermined limits.

References Cited by the Examiner

UNITED STATES PATENTS

| | | | |
|---|---|---|---|
| 457,362 | 8/1891 | Mitchell | 219—38.4 |
| 1,349,130 | 8/1920 | Hadaway | 219—39.05 |
| 1,399,175 | 12/1921 | White | 219—39.05 |
| 1,533,268 | 4/1925 | Reid | 219—38.4 |
| 1,580,293 | 4/1926 | Fitzer | 219—39.05 |
| 1,695,803 | 12/1928 | Elmer | 219—38.4 |
| 1,727,585 | 9/1929 | Carleton | 219—38.4 |
| 1,728,309 | 9/1929 | Shreeve | 219—38.7 |
| 2,083,611 | 6/1937 | Marshall | 165—2 |
| 2,891,773 | 6/1959 | Heller | 165—32 |
| 2,971,746 | 2/1961 | Bell | 165—34 |

FOREIGN PATENTS 691,830   5/1953   Great Britain.

OTHER REFERENCES

Publication: "Proceedings of the International Conference on the Peaceful Uses of Atomic Energy," vol. 3, United Nations, New York, 1955.

ROBERT A. O'LEARY, *Primary Examiner.*

MAX L. LEVY, HERBERT L. MARTIN, CHARLES SUKALO, PERCY L. PATRICK, *Examiners.*